United States Patent [19]

Philipponi

[11] 4,195,861
[45] Apr. 1, 1980

[54] TRAILER WITH TOWBAR

[76] Inventor: Walter F. Philipponi, 41 Waterloo Crescent, Pineland, Pinetown, Natal, South Africa

[21] Appl. No.: 860,993

[22] Filed: Dec. 15, 1977

[51] Int. Cl.² .............................................. B60D 1/00
[52] U.S. Cl. .................................................... 280/489
[58] Field of Search .................... 280/483, 489, 81 R; 188/321

[56] References Cited

U.S. PATENT DOCUMENTS

| | | | |
|---|---|---|---|
| 2,360,902 | 10/1944 | Simmons | 280/81 R |
| 2,452,710 | 11/1948 | Allen | 280/489 |
| 3,193,330 | 7/1965 | Hribar | 280/489 X |
| 3,593,890 | 7/1971 | MacKinnon | 280/489 X |

FOREIGN PATENT DOCUMENTS

| | | | |
|---|---|---|---|
| 1934249 | 7/1969 | Fed. Rep. of Germany | 188/321 |
| 810503 | 3/1937 | France | 280/489 |
| 986837 | 8/1951 | France | 280/489 |
| 517217 | 2/1955 | Italy | 188/88 |

*Primary Examiner*—John A. Pekar
*Attorney, Agent, or Firm*—Young & Thompson

[57] ABSTRACT

A towbar for a trailer including an elongated towing member pivotally securable to the trailer for relative movement thereto in the vertical plane, and damping structure extending between the member and the trailer. The towbar has two members diverging from the hitch point to the trailer. Each member is pivotally connected to the trailer for movement in a vertical plane, and each member has a damping device extending between the member and the trailer, which is connected to the trailer at a point directly above the pivotal connection of the members to the trailer.

1 Claim, 3 Drawing Figures

TRAILER WITH TOWBAR

The present invention relates to a trailer with a towbar. In this specification the term 'trailer' is meant to include any vehicle adapted to be towed.

The towbars which are presently in use may include a single towing member adapted to be attached to the towing vehicle. In a more stable arrangement the towbar may comprise a triangular towing arrangement which includes two towbar members which converge from the trailer to a common hitch point. However, even with the more stable arrangement, instability in motion, especially in the longitudinal direction, is still prevalent.

It is accordingly an object of this invention to provide a towbar and a trailer which have certain advantages over the known arrangements.

According to the invention a towbar includes an elongated member one end of which includes a hitch point and the other end of which is adapted to be pivotally connected to the trailer for movement in a substantially vertical plane, and damping means extending between the trailer and the member.

The pivotal connection between the towbar and the trailer allows for flexibility in motion of the trailer while being towed and the damping means serves to control this flexibility.

The damping means may for example include a resistively yieldable member the ends of which are respectively connected to the member and the trailer. Thus, for example, the yieldable member may comprise a shock absorber of the telescopic type.

Further according to the invention the damping means is adapted to extend from a point on the member disposed between its two ends to a point on the trailer disposed above the pivotal connection between the member and the trailer.

Still further according to the invention the damping means is pivotally connected to both the member and the trailer.

Further according to the invention the towbar includes two members diverging from the hitch point to the trailer, each member being pivotally connectable to the trailer for movement in a substantially vertical plane, and each member including damping means extending between the member and the trailer.

Preferably the member and damping means are each mounted on a flexible bearing carried between two lug formations secured to the trailer.

In one embodiment of the invention each of the members and damping means may be connected pivotally to an elongated extension element the other end of which is pivotally connected to the trailer.

In another embodiment of the invention each member may include additional damping means extending in non pivotal relationship between the end of the member and a bracket mounted on the trailer.

The invention also includes within its scope a trailer including a towbar substantially as herein described.

The invention will now be described further by way of example with reference to the accompanying drawings in which.

Figure 1:
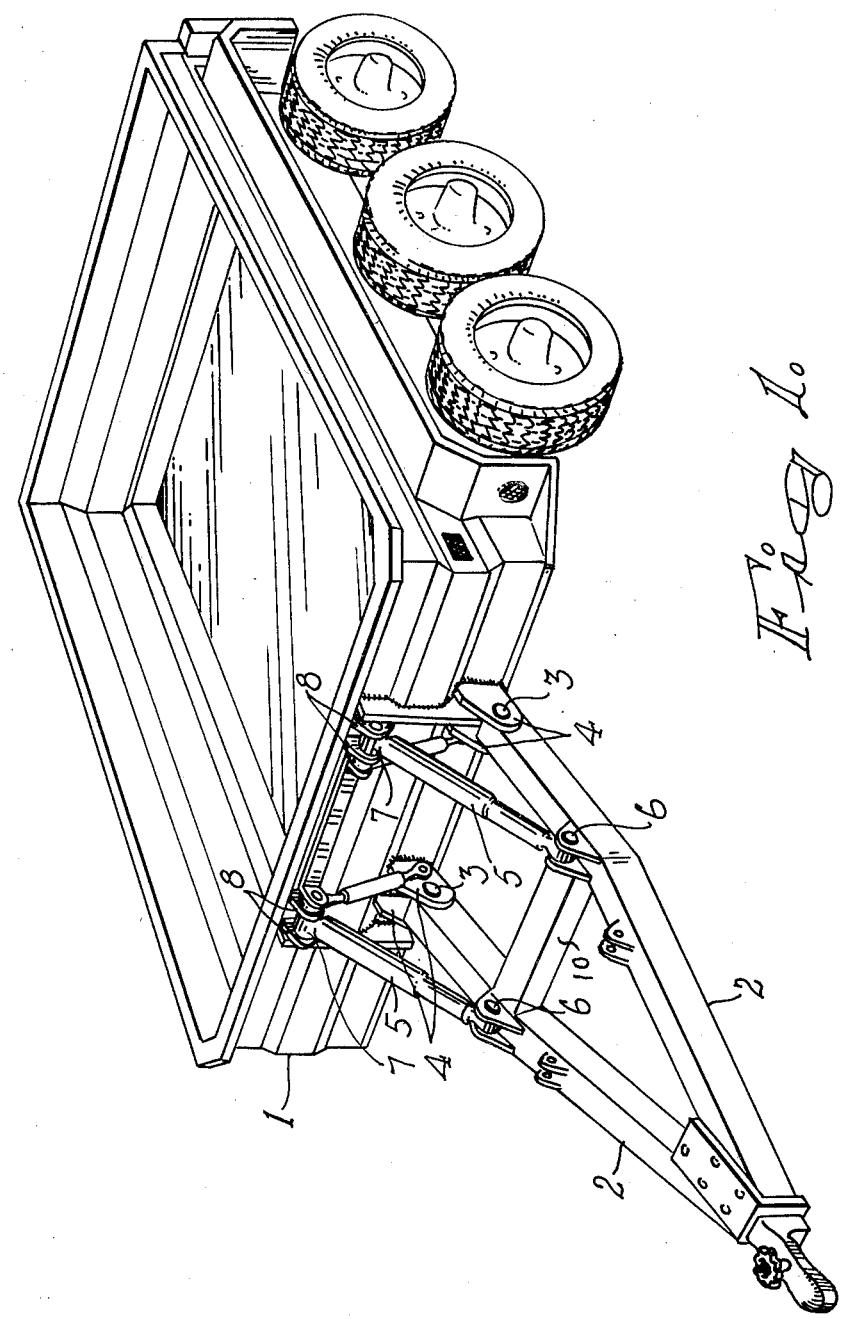
FIG. 1 is a diagrammatic perspective view of one embodiment of a trailer and towbar according to the invention.

Referring to the arrangement shown in FIG. 1 of the drawings, the leading end of a trailer 1 includes a towbar having two converging members 2 each pivotally connected to trailer 1 by a flexible bearing 3 disposed between two lug formations 4 welded onto the body of trailer 1 towards the lower end thereof.

A pair of telescopic shock absorbers 5 of conventional construction have their one ends pivotally connected to members 2 at 6 and their other ends to flexible bearings 7 each carried between two lug formations 8 welded onto trailer 1 in a position disposed towards the upper end thereof.

A pair of reinforcing bars 9 extend between lug formations 4 and 8 while a reinforcing cross member 10 extends between members 2.

Figure 2:
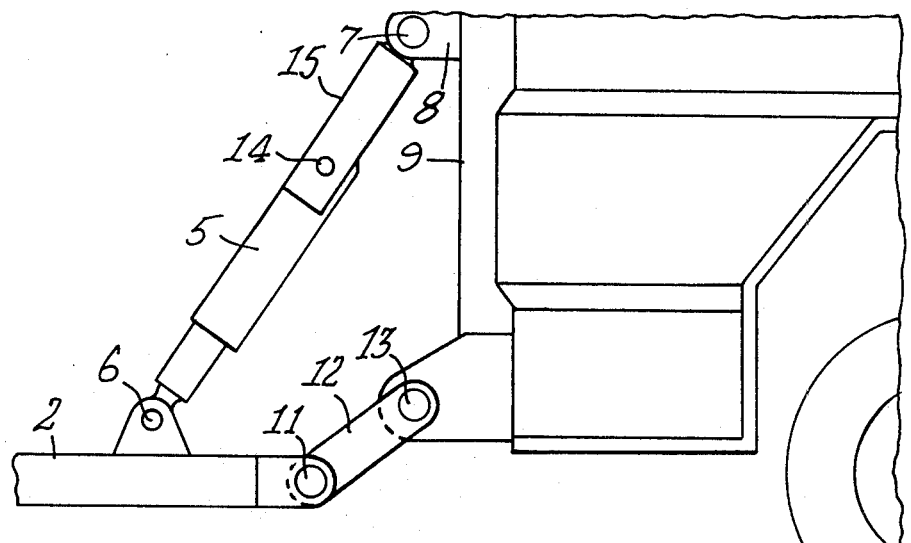
FIG. 2 is a diagrammatic side elevation of another embodiment of a towbar and trailer according to the invention.

In the arrangement shown in FIG. 2 the ends of members 2 are pivotally connected at 11 to an elongated element 12 the other end of which is connected pivotally at 13 to trailer 1. In this arrangement the one end of each shock absorber 5 is pivotally connected at 14 to one end of an extension element 15 the other end of which is carried on the flexible bearing 7 between lug formations 8.

Figure 3:
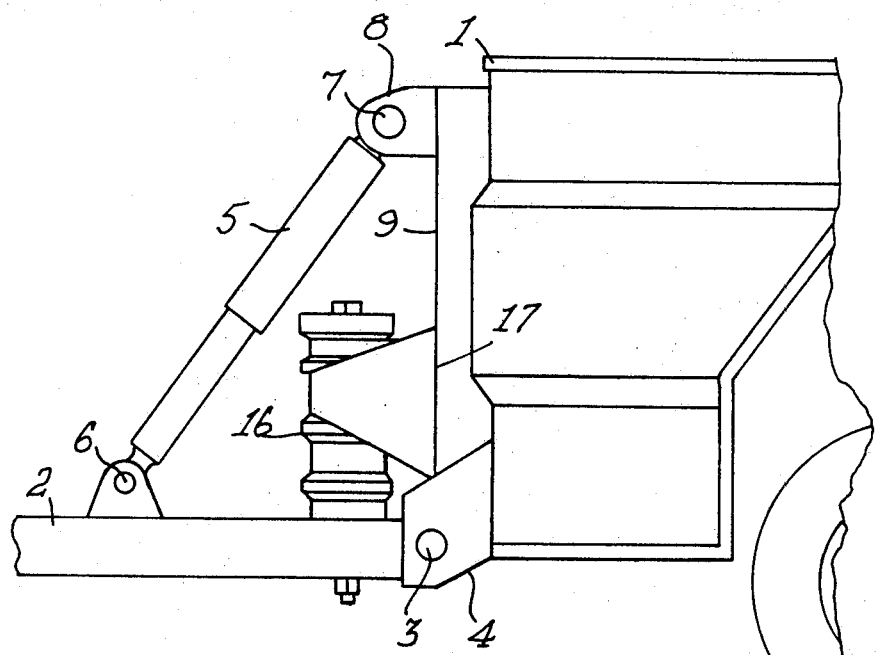
FIG. 3 is a similar view as that of FIG. 2 of yet another embodiment of the invention.

In the arrangement shown in FIG. 3 each member 2 includes a coil spring 16 which is connected to the end of the member and to a bracket 17 which is welded onto trailer 1.

Applicant has found that the pivotal connection and presence of the various damping means on the towbar provides a stability in motion to the trailer, especially in the longitudinal direction, which has hitherto not been possible with the known arrangements.

I claim:

1. A trailer including a towbar having two members diverging from the hitch point to the trailer, each member being pivotally connected to the trailer for movement in a substantially vertical plane, and each member including damping means extending between the member and the trailer, each of the members and damping means being connected pivotally to an elongated extension element the other end of which is pivotally connected to the trailer.

* * * * *